United States Patent
Friedel et al.

(10) Patent No.: US 8,925,869 B2
(45) Date of Patent: Jan. 6, 2015

(54) AERODYNAMIC BODY WITH AN ANCILLARY FLAP

(71) Applicant: Airbus Operations GmbH, Hamburg (DE)

(72) Inventors: Hendrik Friedel, Bremen (DE); Bodo Zapf, Bücken (DE)

(73) Assignee: Airbus Operations GmbH, Hamburg (DE)

( * ) Notice: Subject to any disclaimer, the term of this patent is extended or adjusted under 35 U.S.C. 154(b) by 0 days.

(21) Appl. No.: 13/750,020

(22) Filed: Jan. 25, 2013

(65) Prior Publication Data

US 2013/0266444 A1     Oct. 10, 2013

Related U.S. Application Data

(63) Continuation of application No. PCT/EP2011/003741, filed on Jul. 26, 2011.

(60) Provisional application No. 61/367,504, filed on Jul. 26, 2010.

(30) Foreign Application Priority Data

Jul. 26, 2010   (DE) .................. 10 2010 032 225

(51) Int. Cl.
   *B64C 9/16*       (2006.01)
   *B64C 5/10*       (2006.01)
   *B64C 3/14*       (2006.01)

(52) U.S. Cl.
   CPC ............. *B64C 5/10* (2013.01); *B64C 2003/145* (2013.01); *Y02T 50/44* (2013.01); *B64C 9/16* (2013.01)

USPC ........................... 244/198; 244/113

(58) Field of Classification Search
   USPC .................... 244/198, 201, 213, 215, 217
   See application file for complete search history.

(56) References Cited

U.S. PATENT DOCUMENTS

| | | | | |
|---|---|---|---|---|
| 2,011,902 A | * | 8/1935 | Leigh | 244/215 |
| 2,127,864 A | * | 8/1938 | Girard | 244/231 |
| 2,156,403 A | * | 5/1939 | Riviere | 244/215 |
| 2,791,385 A | * | 5/1957 | Johnson | 244/213 |
| 3,371,888 A | * | 3/1968 | Alvarez-Calderon | 244/216 |

(Continued)

FOREIGN PATENT DOCUMENTS

| | | |
|---|---|---|
| DE | 693 082 | 7/1940 |
| DE | 4107556 | 5/1992 |
| EP | 1 312 545 | 5/2003 |
| WO | WO 2012/013333 | 2/2012 |

OTHER PUBLICATIONS

German Office Action for Application No. 10 2010 032 225.3 dated Dec. 11, 2013.

*Primary Examiner* — Benjamin P Lee
(74) *Attorney, Agent, or Firm* — Jenkins, Wilson, Taylor & Hunt, P.A.

(57) ABSTRACT

An aerodynamic body, with at least one ancillary flap arranged such that it can be moved on the aerodynamic body with the aid of a guide mechanism, and with a drive device for purposes of actuating the ancillary flap, the guide mechanism having a pivotal articulation, by which the ancillary flap is articulated on the aerodynamic body such that it can be extended, and which is arranged in a rear region of the ancillary flap as viewed in the flow direction.

13 Claims, 4 Drawing Sheets

(56) References Cited

U.S. PATENT DOCUMENTS

| | | | |
|---|---|---|---|
| 3,721,406 A * | 3/1973 | Hurlbert | 244/216 |
| 4,542,868 A * | 9/1985 | Boyd | 244/198 |
| 4,867,396 A * | 9/1989 | Wainfan | 244/215 |
| 5,294,080 A * | 3/1994 | Ross | 244/215 |
| 5,342,004 A * | 8/1994 | Bobbitt | 244/212 |
| 5,492,448 A * | 2/1996 | Perry et al. | 416/62 |
| 6,189,837 B1 * | 2/2001 | Matthews | 244/213 |
| 6,382,561 B1 * | 5/2002 | Brink | 244/35 R |
| 6,467,422 B1 * | 10/2002 | Elms | 114/274 |
| 6,491,261 B1 * | 12/2002 | Blake | 244/213 |
| 6,565,045 B1 * | 5/2003 | Correge et al. | 244/215 |
| 6,843,452 B1 * | 1/2005 | Vassberg et al. | 244/203 |
| 6,892,982 B2 * | 5/2005 | Clark | 244/36 |
| 7,410,133 B2 * | 8/2008 | Lee et al. | 244/215 |
| 7,448,578 B2 * | 11/2008 | Clark | 244/213 |
| 7,740,206 B2 * | 6/2010 | Eaton et al. | 244/201 |
| 7,954,769 B2 * | 6/2011 | Bushnell | 244/213 |
| 8,152,110 B2 | 4/2012 | Schlegel et al. | |
| 8,511,620 B2 * | 8/2013 | Matsuda | 244/215 |
| 2003/0218102 A1 * | 11/2003 | Van Dam et al. | 244/215 |
| 2006/0102802 A1 * | 5/2006 | Clark | 244/213 |
| 2007/0221789 A1 * | 9/2007 | Lee et al. | 244/211 |
| 2009/0321582 A1 * | 12/2009 | Eaton et al. | 244/215 |
| 2011/0272532 A1 * | 11/2011 | Matsuda | 244/215 |
| 2013/0228655 A1 * | 9/2013 | Burgunder et al. | 244/214 |

* cited by examiner

AERODYNAMIC BODY WITH AN ANCILLARY FLAP

CROSS-REFERENCE TO RELATED APPLICATIONS

This application is a continuation of and claims priority to PCT Application No. PCT/EP2011/003741, filed Jul. 26, 2011, which claims the benefit of the filing date of German Patent Application No. DE 10 2010 032 225.3 filed Jul. 26, 2010 and of U.S. Provisional Patent Application No. 61/367,504 filed Jul. 26, 2010, the disclosures of which applications are hereby incorporated herein by reference.

TECHNICAL FIELD

The invention concerns an aerodynamic body with an ancillary flap.

BACKGROUND

From DE 41 07 556 C1 a drive and guide device for a flap arranged on an aeroplane wing, in particular for a trailing edge flap or a landing flap, is of known art. The drive and guide device comprises a carriage, on which the flap is held such that it can move, and which can be traversed on a support and guide rail.

EP 1 312 545 B1 describes an aerodynamic profile with an adjustable flap, which has a front profile region, and also a rear profile region located in the wake flow, and which is bounded by a covering skin on the pressure surface and also the suction surface. The pressure surface and suction surface covering skins merge together in the rear profile region into a profile trailing edge.

SUMMARY

The object of the invention is to create an aerodynamic body with an ancillary flap, in which the ancillary flap is particularly favourably arranged aerodynamically and can be actuated in a reliable manner.

This object is achieved with the features of claim 1. Further forms of embodiment are specified in the dependent claims.

The aerodynamic body in accordance with the invention has at least one ancillary flap arranged on the aerodynamic body such that it can be moved with the aid of a guide mechanism, and a drive device for purposes of actuating the ancillary flap. The drive mechanism has a pivotal articulation, by means of which the ancillary flap is articulated on the aerodynamic lifting body such that it can be extended. Here provision is made that the pivotal articulation of the drive mechanism is arranged in a rear region of the ancillary flap, as viewed in the flow direction. The rear region can be the chordwise area of the ancillary flap extending at maximum 20% or preferably 10% of the maximum chord length of the ancillary flap fro the leading edge of the ancillary flap.

The extendable ancillary flap serves the purpose of modifying the lift coefficient of the aerodynamic body under certain cruise conditions. The ancillary flap, with its articulation on the aerodynamic lifting body in its rear region, acts such that with an airflow in the flow direction a stagnation pressure already occurs ahead of the ancillary flap when the ancillary flap is slightly extended, which contributes to the further extension of the ancillary flap. Thus one surface of the ancillary flap, which when the ancillary flap is retracted is facing towards an inner surface of the aerodynamic lifting body, is exposed when the ancillary flap is extended to the airflow in the flow direction such that the stagnation pressure forms on this surface of the ancillary flap.

This enables the drive device for purposes of actuating the ancillary flap to be of a relatively simple design. This can contribute to the production of the drive device in a light and space-saving manner, and/or to the ability to open the ancillary flap reliably. Furthermore, by this means the guide mechanism can be arranged completely within the aerodynamic body, which is particularly favourable in aerodynamic terms. The flow direction corresponds to the direction along which the airflow in the assumed flight state, that is to say, e.g. in cruise flight, flows past the aerodynamic body. The guide mechanism serves the purpose of guiding and/or mounting the ancillary flap on the aerodynamic body.

Furthermore as a result of the coupling of the ancillary flap in its rear region in the chordwise direction of the aerodynamic body, a trailing edge of the ancillary flap, as viewed in the flow direction, is located particularly far to the rear with reference to the aerodynamic lifting body, which has a favourable effect on the lift and the maximum lift when the ancillary flap is extended. When the ancillary flap is retracted this serves as a fairing for the aerodynamic lifting body, as a result of which a separate fairing can be dispensed with. This leads to a reduction of the air resistance when the ancillary flap is retracted, for example during cruise flight, which leads to a reduction in the fuel consumption, as a result of which the range of the aeroplane increases. Furthermore, the lack of the separate fairing leads to a weight saving, which once again reduces the fuel consumption. Maintainability and manufacturing costs are likewise influenced in a positive manner.

The aerodynamic body can be a main wing surface of a wing, which in addition to the main wing surface and the ancillary flap can also comprise leading edge slats or further flaps. Alternatively, the aerodynamic lifting body is, for example, a leading edge slat of the wing, or one of the flaps of the wing, which are arranged on the main wing surface such that they can be moved. The flap on which the ancillary flap is articulated, can, for example, be a control flap, and in particular a spoiler, or a high-lift flap, and in particular a trailing edge flap. In this context the ancillary flap can also be embodied as a mini trailing edge flap. Here the mini trailing edge flap can be embodied such that its chord amounts to 0.3 to 7% of the wing chord of the main wing surface, if the mini trailing edge flap is arranged on the main wing surface, or such that its chord amounts to 0.3 to 7% of the chord of the flap, if the mini trailing edge flap is arranged on a flap.

The aerodynamic lifting body has a pressure surface and a suction surface. During cruise flight the pressure surface is located on the underside of the aerodynamic lifting body. The ancillary flap is preferably arranged on the lower surface of the aerodynamic lifting body. Alternatively the ancillary flap can also be arranged on an upper surface of the aerodynamic lifting body.

In accordance with one example of embodiment the aerodynamic lifting body has an extension aid, which is designed and arranged such that with its help at least in the retracted state of the ancillary flap a force can be exerted onto the ancillary flap in the extension direction, and thus the ancillary flap can at least partially be extended. Here with the help of the extension aid the ancillary flap can, for example, be extended just to the point at which the airflow in the flow direction can build up the stagnation pressure ahead of the ancillary flap. In this context the extension aid comprises, for example, an energy store, which receives and stores energy as the ancillary flap is retracted, and which subsequently uses this stored energy for purposes of extending the ancillary flap at least partially. The energy store comprises, for example, an elastic element, in particular a spring, which in the retracted state is supported on the one hand on the ancillary flap, and on the other hand on the aerodynamic lifting body.

In accordance with a further example of embodiment the guide mechanism has a cable, which on the one hand is coupled with the drive device, and on the other hand, with the ancillary flap. With the aid of the drive device and the cable line a force can be exerted on the ancillary flap in the retraction direction. The cable line can, for example, be a Bowden cable line. This enables an optimal transmission of force from the drive device onto the ancillary flap in a simple manner. The cable line is, for example, of an elastic design. Alternatively, an axial section of the cable line can take the form of an extensible element. This contributes to the fact that any vibrations occurring on the ancillary flap are not transmitted to the drive device, and that despite any production tolerances occurring the ancillary flap can be fully retracted.

Starting from a trailing edge of the aerodynamic body with the ancillary flap retracted, the cable line can, as viewed in the chordwise direction, be arranged downstream or behind the elastic element and the pivotal articulation. Alternatively the cable line can also be arranged between the elastic element and the pivotal articulation.

In an alternative example of embodiment the guide mechanism comprises a connecting lever, and a second and a third pivotal articulation. The second pivotal articulation is arranged on the ancillary flap, at some distance from the trailing edge of the ancillary flap, and from a leading edge of the ancillary flap. In a first end region of the connecting lever the connecting lever is articulated on the ancillary flap by means of a second pivotal articulation. On a second end region located opposite to the first end region the connecting lever is articulated on the aerodynamic lifting body by means of a third pivotal articulation. The pivotal articulation, or the third pivotal articulation, is arranged on the aerodynamic lifting body such that it can be moved in the chordwise direction.

BRIEF DESCRIPTION OF THE DRAWINGS

In what follows examples of embodiment of the invention are described with the aid of the accompanying figures. In the figures.

DETAILED DESCRIPTION

Elements of the same design or function are allocated the same reference symbols across the figures. For purposes of describing the aerodynamic body in accordance with the invention reference is made to the coordinate system KS registered e.g. in FIG. 1, with a spanwise direction SW, a chordwise direction TR, and a wing thickness direction DR of the aerodynamic body respectively.

Figure 1:
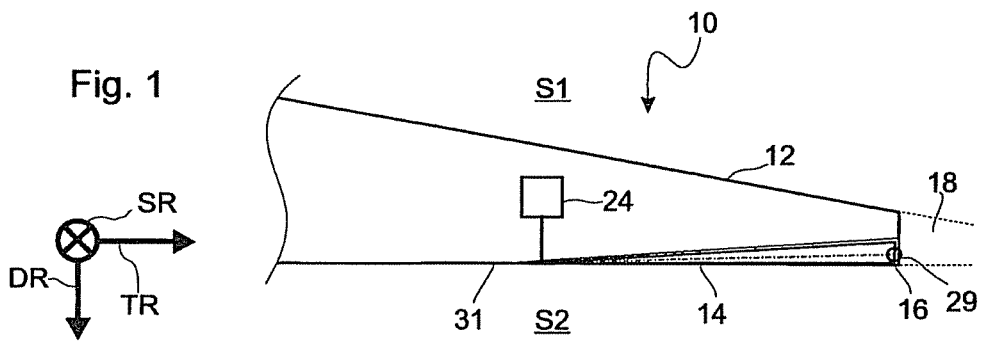
FIG. 1 shows a cross-section through a rear region of a first example of embodiment of the aerodynamic body in accordance with the invention with a retracted ancillary flap.

FIG. 1 shows a cross-section through a rear region, as viewed in the chordwise direction TR, of an aerodynamic body in the form of a main wing surface 12. The aerodynamic body can be a main wing 12 of a wing 10, in particular of a passenger or freight aeroplane. Alternatively, the aerodynamic body can be a leading edge slat of the wing 10, or a flap of the wing 10, which is arranged on the main wing surface 12 of the wing 10, for example, a trailing edge flap, or a control flap such as a spoiler. An optionally provided trailing edge 18 of the main wing surface 12 is just partially represented and indicated as a dashed line. The upper surface of the aerodynamic body or main wing 12 facing a suction surface S1 facing a suction area generated by the flow around the aerodynamic body, and the lower surface facing a pressure surface S2, can converge at an acute angle at the trailing edge 18 of the aerodynamic body with the suction surface S1. The suction surface S1 and the pressure surface S2 ensue from the flow around the aerodynamic body 10, by virtue of a flow incident onto the latter with a flow direction S in accordance with its intended purpose.

Generally, the main wing or the adjustable flap has a first or upper side and a first or upper aerodynamic surface and has a second or lower side and second or lower aerodynamic surface, which is lying or is directed in opposite to the first aerodynamic surface. The ancillary flap 14 is coupled to the main wing or the flap, respectively, such that it is located at a second or lower side of the wing or the flap. Preferably, the second or lower side of the ancillary flap 14 is completing the second surface of the main wing or the flap, respectively, when the ancillary flap 14 is in its retracted position so that, in this state, the second or lower side of the ancillary flap 14 is aerodynamically a part of the second surface of the main wing or the flap.

The guide mechanism 25 comprises a pivotal articulation 16, by means of which the ancillary flap 14 is articulated on the main wing surface 12, and in fact in a rear region of the ancillary flap 14 as viewed in the flow direction. The pivotal articulation 16 can in particular be stationary fixed position on the ancillary flap 14 and the aerodynamic body, respectively. The ancillary flap 14 in its front region, in particular at its leading edge 31, is coupled with a drive device 24 for purposes of actuating the ancillary flap 14. The drive device 24 enables the ancillary flap 14 to be extended downwards in the direction of the pressure surface S2. As soon as the ancillary flap is slightly extended, with an airflow in the flow direction a stagnation pressure occurs ahead of the ancillary flap, which contributes to the further extension of the ancillary flap 14.

The length of the ancillary flap 14 can correspond, for example, to between 0.2 and 50 percent of the length of the aerodynamic body in the chordwise direction TR. In particular, the ancillary flap 14 can be realized as mini flap with a maximum chord length or a mean chord length between 0.2 percent and 5 percent of the mean chord length of the main wing or the flap, respectively, in the spanwise area of the ancillary flap 14. Alternatively, the ancillary flap 14 can be realized as control flap or adjustable flap, being coupled to a main wing or another flap and in particular a high lift flap. In FIG. 1 the ancillary flap 14 is located in the retracted state. In particular, the ancillary flap 14 is located in all its positions relative to the of the main wing or the flap, respectively, at the lower surface of the of the main wing or the flap, respectively.

Figure 2:
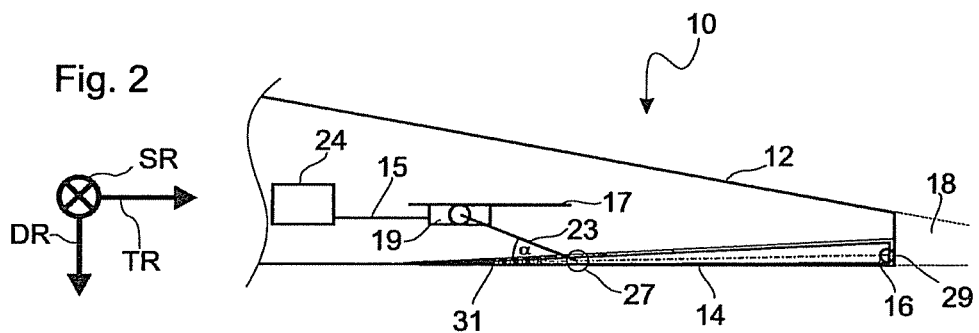
FIG. 2 shows a cross-section through a rear region of a second example of embodiment of the aerodynamic body in accordance with the invention with a retracted ancillary flap.

FIG. 2 shows a cross-section through a second example of embodiment of the aerodynamic lifting body. The wing 10 has the main wing surface 12 and the ancillary flap 14. In this context the main wing surface 12 is, for example, the aerodynamic body. The ancillary flap 14, in its rear region, as viewed in the flow direction, in particular at its trailing edge 29, is articulated on the main wing surface 12 by means of the pivotal articulation 16. If the wing 10 has a trailing edge flap (not represented), the ancillary flap 14 can also be articulated on the trailing edge flap. In this example of embodiment the guide mechanism 25 has a pivotal articulation 16, a second pivotal articulation 27, a third pivotal articulation 21, and a connecting lever 23. The connecting lever 23 can also be denoted as a regulating rod. The ancillary flap 14 is articulated at some distance from its leading edge 31, by means of the second pivotal articulation 27 on the connecting lever 23, in particular on a first end region of the connecting lever 23. On a second end region of the connecting lever 23 the latter is articulated, by means of the third pivotal articulation 21, on a slide 19. The slide 19 is guided by a guide device, in particular a guide rail 17, being mounted to or arranged at the aerodynamic body such that it can be moved in the chordwise direction TR of the the aerodynamic body. The drive device 24 enables the slide 19 to move in the chordwise direction TR with the aid of a stroke rod 15. The connecting lever 23 and a straight line through the pivotal articulation 16 and the second pivotal articulation 29, 27 subtend a transmission angle $\alpha$, which is preferably greater than 5 degrees, in order that the guide mechanism 25 is not operating in its dead-centre position. The length of the connecting lever 23 corresponds, for example, to between ¼ and ¾ of the length of the ancillary flap 14.

Figure 3:
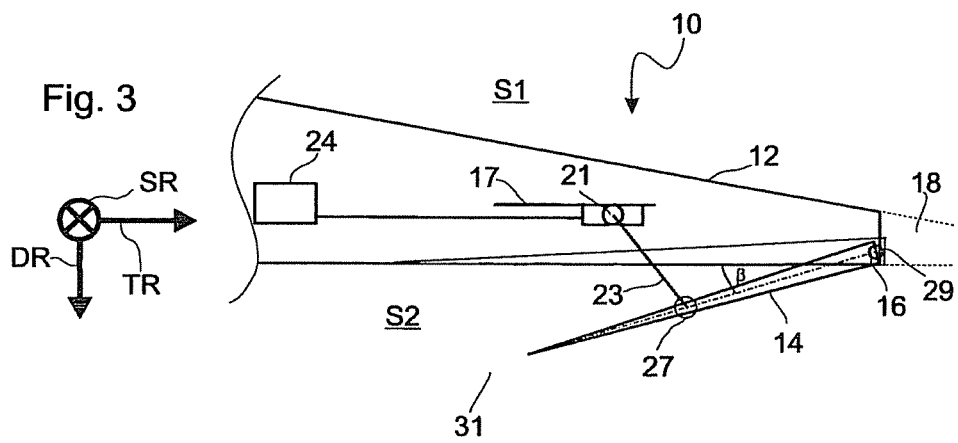
FIG. 3 shows the second example of embodiment of the aerodynamic body in accordance with the invention in the representation of FIG. 2 with a partially extended ancillary flap.

FIG. 3 shows the second example of embodiment of the aerodynamic body as per FIG. 2, wherein the slide 19 is displaced in the chordwise direction TR of the aerodynamic body 10 further rearwards in the direction towards the trailing edge 18 of the main wing surface 12. This causes the ancillary flap 14 to be partially swung out. In the partially extended setting the ancillary flap 14, and a lower surface of the main wing surface 12, facing the pressure surface S2, subtend an extension angle of, for example, 30 degrees.

Figure 4:
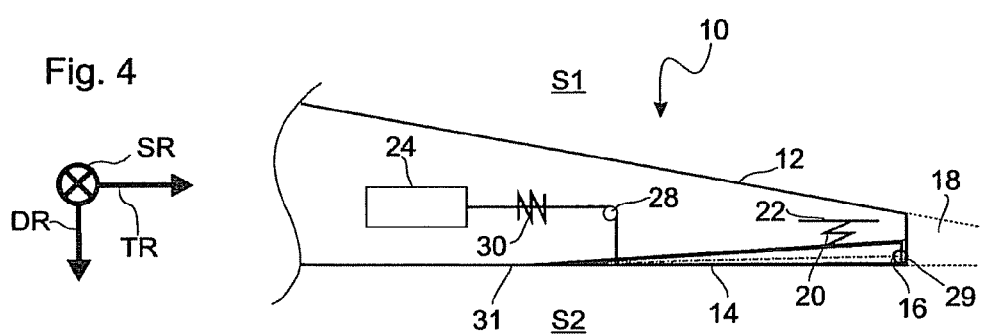
FIG. 4 shows a cross-section through a rear region of a third example of embodiment of the aerodynamic body in accordance with the invention.

FIG. 4 shows a cross-section through a third example of embodiment of the aerodynamic body. The wing 10 has the main wing surface 12 and the ancillary flap 14, wherein the main wing surface 12 represents the aerodynamic body. The ancillary flap 14, in its rear region, as viewed in the flow direction, in particular at its trailing edge 29, is articulated on the main wing surface 12 by means of the pivotal articulation 16. If the wing 10 has a trailing edge flap, the ancillary flap 14 can thus also be articulated on the trailing edge flap. The ancillary flap 14 is attached to a cable line 26 at a coupling location at some distance from its leading edge 31. The cable line 26 is designed such that it can extend and/or the cable line 26 comprises an axial section, which is replaced by an extensible element 30. Alternatively the cable line 26 can be designed as a Bowden cable line. At its opposite end the cable line 26 is coupled with the drive device 24, with the aid of which the cable line 26 can be subjected to a tensile force, or with the aid of which the tensile force can be removed.

At some distance from the trailing edge 29 of the ancillary flap 14 the ancillary flap 14 is coupled with an extension aid. The extension aid enables the ancillary flap 14 to extend from its retracted setting. For this purpose the extension aid comprises for example, an energy store, in particular an elastic element 20, which is supported on the one hand on the retracted ancillary flap 14, and on the other hand on a spring mounting 22, which is securely connected with the main wing surface 12. In a simple variant of embodiment the elastic element 20 comprises a spring, which in the retracted setting is pre-stressed between the ancillary flap 14, and the spring mounting 22, and which subjects the ancillary flap 14 to a force in the extension direction. Alternatively the extension aid can have an eccentric, with the aid of which the ancillary flap 14 can be moved out of its retracted state. In the chordwise direction TR of the aerodynamic body 10 are arranged, starting from the trailing edge 18 of the aerodynamic body 10, firstly the pivotal articulation 16, then the extension aid, and then the coupling location for the cable line 26.

Figure 5:
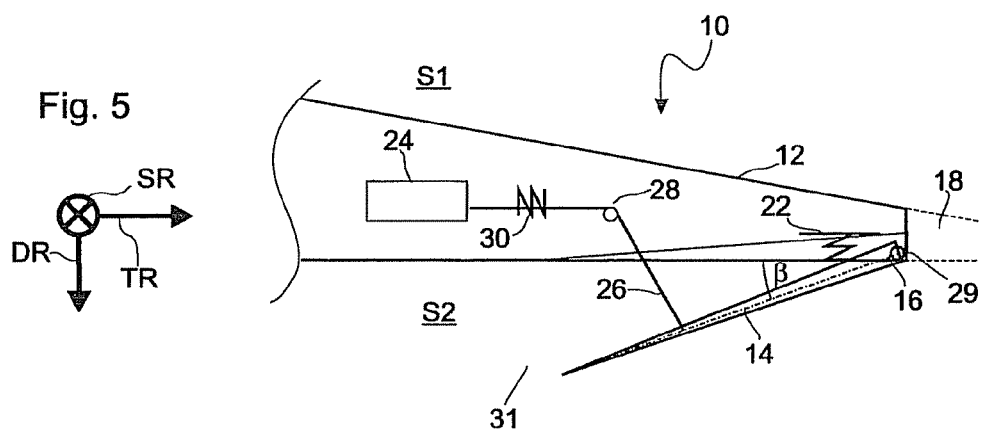
FIG. 5 shows the third example of embodiment of the aerodynamic body in accordance with the invention in the representation of FIG. 4 with a partially extended ancillary flap.

FIG. 5 shows the third example of embodiment of the aerodynamic body as per FIG. 4, with a partially extended ancillary flap 14. With the lower surface of the main wing surface 12 the ancillary flap 14 subtends the extension angle $\beta$, which in the partially extended setting is, for example, 30 degrees. In such a partially extended setting the extension aid no longer acts on the ancillary flap 14. For purposes of the further extension of the ancillary flap 14 the stagnation pressure is utilised in this example of embodiment; this builds during the flight of the aeroplane as a result of the airflow that flows past the lower surface of the aerodynamic body, namely the pressure surface S2, and extends the ancillary flap 14 further. Here the extension angle $\beta$ is a function of an effective length of the cable line 26. The effective length corresponds to the length that the cable line 26 has between the ancillary flap 14, and the drive device 24.

Figure 6:
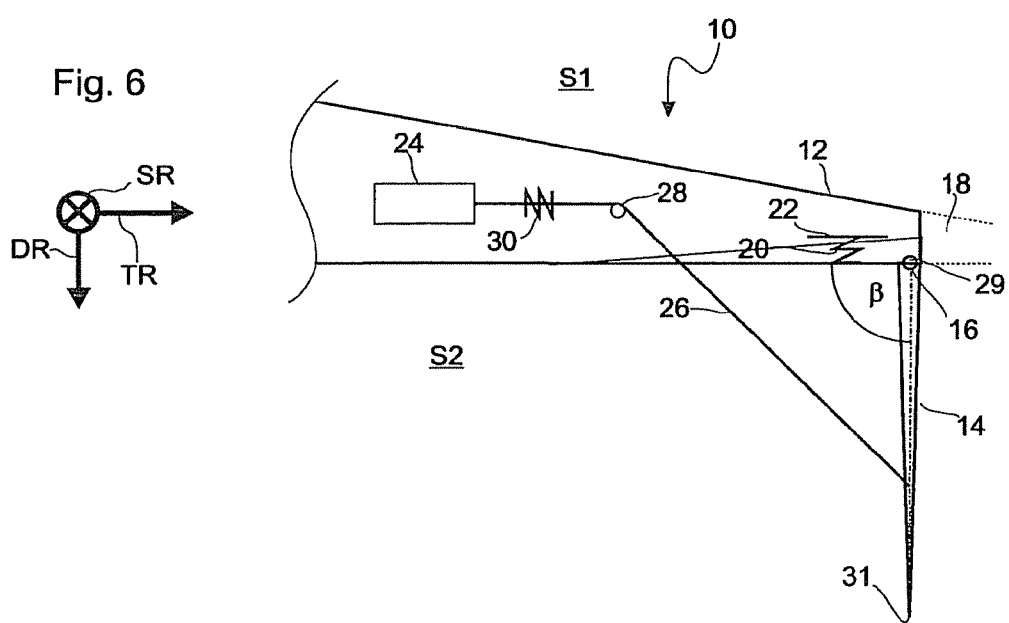
FIG. 6 shows the third example of embodiment of the aerodynamic body in accordance with the invention in the representation of FIG. 4 with a fully extended ancillary flap.

FIG. 6 shows the third example of embodiment of the aerodynamic body as per FIGS. 4 and 5, wherein the ancillary flap 14 is located in the fully extended state. In the fully extended state the extension angle $\beta$ is approximately equal to 90 degrees. In the fully extended state the extension angle $\beta$ can also be more or less than 90 degrees. For purposes of retracting the ancillary flap 14 the cable line 26 is subjected to a tensile force with the aid of the drive device 24, at least until the ancillary flap 14 pre-stresses the elastic element 20, in order that a renewed extension of the ancillary flap 14 is reliably possible.

Figure 7:
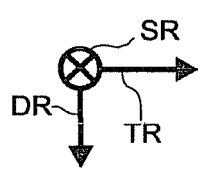
FIG. 7 shows a cross-section through a rear region of a fourth example of embodiment of the aerodynamic body in accordance with the invention with a partially extended ancillary flap.
Figure 7:
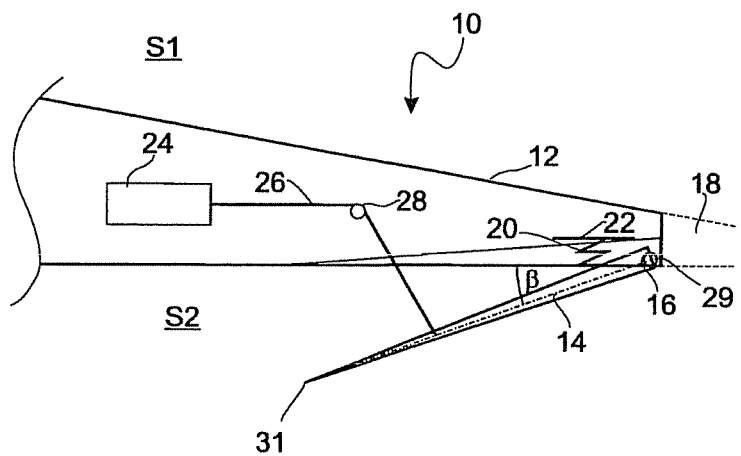

FIG. 7 shows a cross-section through a fourth example of embodiment of the aerodynamic body, which, for example, is once again designed as a main wing surface 12 of the wing 10. The ancillary flap 14, in its rear region, in particular at its trailing edge 29, is articulated on the main wing surface 12 by means of the pivotal articulation 16. In this application, the rear region of the ancillary flap 14 can in particular be a region extending at maximum 20% and preferably 10% of the maximum chord length of the ancillary flap 14 from the leading edge of the same. If the wing 10 has a trailing edge flap, the ancillary flap 14 can thus also be articulated on the trailing edge flap, which then represents the aerodynamic body. The ancillary flap 14 is attached to the cable line 26 at some distance from its leading edge 31. The cable line 26 is designed such that it can extend, and does not comprise an extensible element 30. At its opposite end the cable line 26 is coupled with the drive device 24, with the aid of which the cable line 26 can be subjected to a tensile force, or with the aid of which the tensile force can be removed.

At some distance from the trailing edge 29 of the ancillary flap 14 the ancillary flap 14 is coupled with the extension aid. The extension aid enables the ancillary flap 14 to extend from its retracted setting. For this purpose the extension aid comprises for example, an energy store, in particular the elastic element 20, which is supported on the one hand on the retracted ancillary flap 14, and on the other hand on the spring mounting 22. In a simple variant of embodiment the elastic element 20 comprises a spring, which in the retracted setting is pre-stressed between the ancillary flap 14 and the spring mounting 22, and which subjects the ancillary flap 14 to a force in the extension direction. Alternatively, the extension aid can have an eccentric. In the chordwise direction TR of the aerodynamic body 10 are arranged, starting from the trailing edge 18 of the main wing surface 12, firstly the pivotal articulation 16, then the extension aid, and then the coupling location for the cable line 26.

Figure 8:
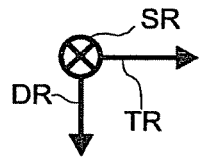
FIG. 8 shows a cross-section through a rear region of a fifth example of embodiment of the aerodynamic body in accordance with the invention with a partially extended ancillary flap.
Figure 8:
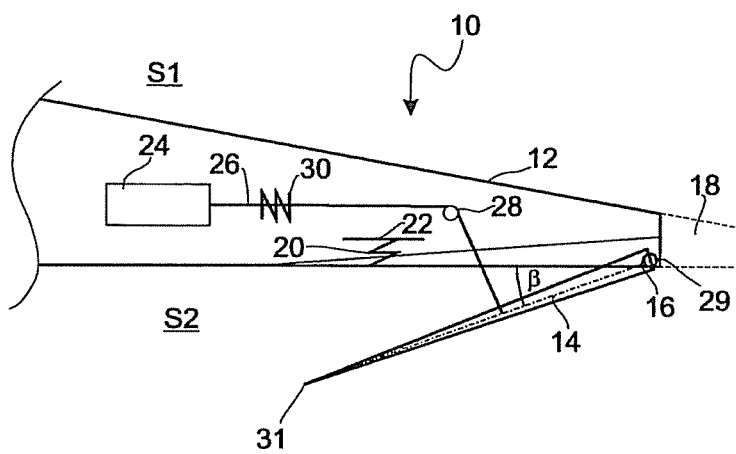

FIG. 8 shows a cross-section through a fifth example of embodiment of the aerodynamic body, which, for example, is once again designed as a main wing surface 12 of the wing 10. The ancillary flap 14, in its rear region, as viewed in the flow direction, in particular at its trailing edge 29, is articulated by means of the pivotal articulation 16 on the main wing surface 12. If the wing 10 has a trailing edge flap, the ancillary flap 14 can thus also be articulated on the trailing edge flap. The ancillary flap 14 is attached to the cable line 26 at some distance from its leading edge 31. The cable line 26 is designed such that it can extend and comprises the extensible element 30. At its opposite end the cable line 26 is coupled with the drive device 24, with the aid of which the cable line 26 can be subjected to a tensile force, or with the aid of which the tensile force can be removed. The cable line 26 can also be designed as a Bowden cable line.

At some distance from the leading edge 31 of the ancillary flap 14 the ancillary flap 14 is coupled with the extension aid. The extension aid enables the ancillary flap 14 to extend from its retracted setting. For this purpose the extension aid comprises for example, an energy store, in particular the elastic element 20, which is supported on the one hand on the retracted ancillary flap 14, and on the other hand on the spring mounting 22. In a simple variant of embodiment the elastic element 20 comprises a spring, which in the retracted setting is pre-stressed between the ancillary flap 14 and the spring mounting 22, and which subjects the ancillary flap 14 to a force in the extension direction. Alternatively, the extension aid can comprise an eccentric. In the chordwise direction TR are arranged, starting from the trailing edge 18 of the aerodynamic body, firstly the pivotal articulation 16, then the coupling location for the cable line 26, and then the extension aid.

Figure 9:
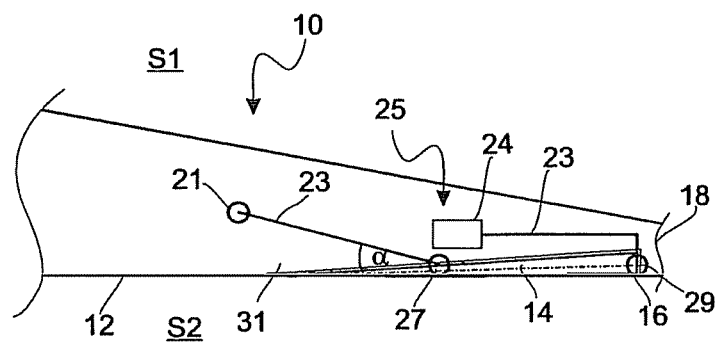
FIG. 9 shows a cross-section through a sixth example of an embodiment of the aerodynamic body.

FIG. 9 shows a cross-section through a sixth example of embodiment of the aerodynamic body. The wing 10 has the main wing surface 12 and the ancillary flap 14. In this context the main wing surface 12 is, for example, the aerodynamic body. The ancillary flap 14, in its rear region, as viewed in the flow direction, in particular at its trailing edge 29, is articulated by means of the pivotal articulation 16 on the main wing surface 12. If the wing 10 has a trailing edge flap, the ancillary flap 14 can thus also be articulated on the trailing edge flap, which then represents the aerodynamic body. In this example of embodiment the guide mechanism 25 has a pivotal articulation 16, the second pivotal articulation 27, the third pivotal articulation 21, and the connecting lever 23. The ancillary flap 14 is articulated on the connecting lever 23, at some distance from its leading edge 31, by means of the second pivotal articulation 27, in particular it is articulated on a first end region of the connecting lever 23. At a second end region of the connecting lever 23 the latter is articulated on the main wing surface 12, by means of the third pivotal articulation 21. The pivotal articulation 16 is arranged on the main wing surface 12 such that it can be moved in the chordwise direction TR. The drive device 24 enables the pivotal articulation 16 to be moved in the chordwise direction TR with the aid of the stroke rod 15. The connecting lever 23 and a straight line through the pivotal articulation 16 and the second pivotal articulation 27 subtend a transmission angle α, which is preferably greater than 5 degrees, in order that the guide mechanism 25 is not operating in its dead-centre position. The length of the connecting lever 23 corresponds, for example, to between ¼ and ¾ of the length of the ancillary flap 14.

Figure 10:
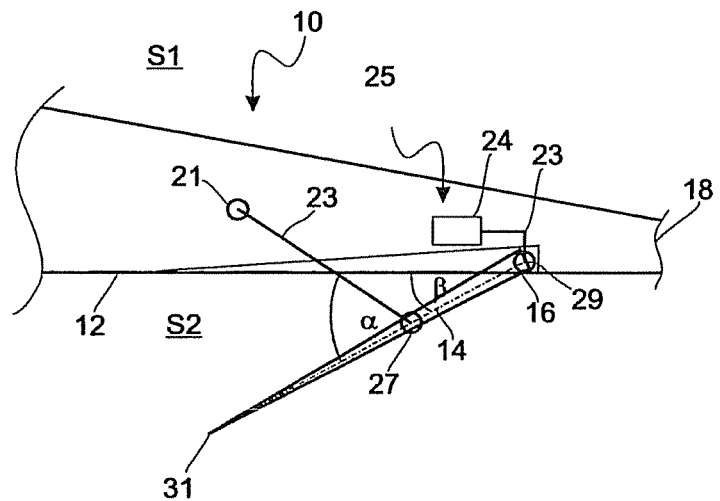
FIG. 10 shows the sixth example of the aerodynamic body as per FIG. 9, wherein the pivotal articulation is displaced further forwards in the chordwise direction TR of the aerodynamic body, in the direction away from the trailing edge of the main wing surface.

FIG. 10 shows the sixth example of embodiment of the aerodynamic body as per FIG. 9, wherein the pivotal articulation 16 is displaced further forwards in the chordwise direction TR of the aerodynamic body 10, in the direction away from the trailing edge 18 of the main wing surface 12. This causes the ancillary flap 14 to be partially extended. In the partially extended setting the ancillary flap 14 and the lower surface of the main wing surface 12 subtend an extension angle of, for example, 30 degrees.

The invention is not limited to the examples of embodiment specified. For example, features of different examples of embodiment can be combined with one another so as to complement one another. Furthermore, the extension aid can be driven electrically or hydraulically, and can be electronically controlled.

REFERENCE SYMBOL LIST

10 Wing
12 Main wing surface
14 Ancillary flap
15 Stroke rod
16 Pivotal articulation
17 Guide rail
18 Main wing surface trailing edge
19 Slide
20 Elastic element
21 Third pivotal articulation
22 Spring mounting
23 Connecting lever
24 Drive device
25 Guide mechanism
26 Cable line
27 Second pivotal articulation
28 Turning roller
29 Ancillary flap trailing edge
30 Extensible element
31 Ancillary flap leading edge
S1 Suction surface
S2 Pressure surface
TR Chordwise direction
SR Spanwise direction
DR Thickness direction
α Transmission angle
β Extension angle

The invention claimed is:

1. An aerodynamic body, with at least one ancillary flap arranged such that the at least one ancillary flap is movable on the aerodynamic body with aid from a guide mechanism, and with a drive device for purposes of actuating the ancillary flap, wherein the guide mechanism comprises:
- a pivotal articulation, by which the ancillary flap is articulated on the aerodynamic body such that it is extendable wherein when the ancillary flap is retracted, the pivotal articulation is arranged in a rear region of the ancillary flap as viewed in a chordwise direction of the aerodynamic body such that the pivotal articulation can be displaced in the chordwise direction on the aerodynamic body,
- a connecting lever,
- a second pivotal articulation, which is arranged on the ancillary flap at a distance from a trailing edge of the ancillary flap, and at a distance from a leading edge of the ancillary flap, and on which the connecting lever is articulated in a first end region of the connecting lever, and
- a third pivotal articulation, at which the connecting lever is articulated on the aerodynamic body in a second end region of the connecting lever located opposite to the first end region.

2. The aerodynamic body in accordance with claim 1, which is designed as a main wing of a wing.

3. The aerodynamic body in accordance with claim 1, which is designed as a leading edge slat or flap, and is arranged on a main wing surface of a wing such that it is movable.

4. The aerodynamic body in accordance with claim 1, in which the ancillary flap is arranged on a pressure surface of the aerodynamic body.

5. The aerodynamic body in accordance with claim 1, with an extension aid, which is designed and arranged such that with its aid, at least in a retracted state of the ancillary flap, a force can be exerted in an extension direction onto the ancillary flap, and thus the ancillary flap can be at least partially extended.

6. The aerodynamic body in accordance with claim 5, in which the extension aid comprises an energy store, which stores energy as the ancillary flap is retracted, and which subsequently uses this stored energy for purposes of extending the ancillary flap at least partially.

7. The aerodynamic body in accordance with claim 6, in which the energy store comprises an elastic element, which in the retracted state is supported on one end on the ancillary flap, and on an other end on the aerodynamic body.

8. The aerodynamic body in accordance with claim 1, in which the guide mechanism comprises a cable line, which on one end is coupled with the drive device, and on an other end with the ancillary flap, wherein with aid from the drive device and the cable line the ancillary flap can be subjected to a force in a retraction direction.

9. The aerodynamic body in accordance with claim 8, in which the cable line is designed as a Bowden cable line.

10. The aerodynamic body in accordance with claim 8, in which the cable line is elastically designed and/or in which an axial section of the cable line is formed by an extensible element.

11. The aerodynamic body in accordance with claim 8, in which, as viewed in the chordwise direction, starting from the trailing edge of the aerodynamic body, are coupled firstly the pivotal articulation, then an elastic element, and then the cable line to the ancillary flap.

12. The aerodynamic body in accordance with claim 8, in which, as viewed in the chordwise direction, starting from the trailing edge of the aerodynamic body, are coupled firstly the pivotal articulation, then the cable line, and then an elastic element to the ancillary flap.

13. The aerodynamic body in accordance with claim 1, the guide mechanism comprising:
- the connecting lever,
- the second pivotal articulation, which is arranged on the ancillary flap at the distance from the trailing edge of the ancillary flap, and at the distance from the leading edge of the ancillary flap, and on which the connecting lever is articulated in the first end region of the connecting lever, and
- the third pivotal articulation, at which the connecting lever is articulated in the second end region of the connecting lever located opposite to the first end region, and which is articulated on the aerodynamic body such that it can be moved in the chordwise direction.

* * * * *